United States Patent [19]

Nakagawa et al.

[11] 4,270,500
[45] Jun. 2, 1981

[54] INTERNAL COMBUSTION ENGINE WITH DUAL INDUCTION SYSTEM

[75] Inventors: Yasuhiko Nakagawa, Kamakura; Yukihiro Etoh, Yokohama; Meroji Nakai, Yokosuka; Ryoji Nakajima, Yokohama, all of Japan

[73] Assignee: Nissan Motor Company, Limited, Yokohama, Japan

[21] Appl. No.: 966,372

[22] Filed: Dec. 4, 1978

[30] Foreign Application Priority Data

Dec. 19, 1977 [JP] Japan .................... 52-152551
Feb. 17, 1978 [JP] Japan .................... 53-19113[U]

[51] Int. Cl.³ ............................................. F02B 75/18
[52] U.S. Cl. .................................. 123/308; 123/432
[58] Field of Search .............. 123/75 B, 127, 30 C, 123/30 D, 119 A, 308, 432

[56] References Cited

U.S. PATENT DOCUMENTS

| | | | |
|---|---|---|---|
| 3,678,905 | 7/1972 | Diehl | 123/75 B |
| 3,903,849 | 9/1975 | List | 123/30 C |
| 4,174,686 | 11/1979 | Shimizu | 123/308 |
| 4,196,703 | 4/1980 | Okitsu | 123/308 |

Primary Examiner—Ronald H. Lazarus
Attorney, Agent, or Firm—Lowe, King, Price & Becker

[57] ABSTRACT

A spark ignition reciprocatory internal combustion engine with dual induction system is provided which has within a cylinder head a primary induction passage or a primary intake port passage to direct fluid charge into a cylinder to swirl therein and a secondary induction passage or a secondary intake port passage to direct fluid charge into the cylinder in such a direction as to impeded and reduce the swirling motion of the first fluid charge to provide a low "swirl ratio" within the cylinder, thereby to maintain the volumetric efficiency of the engine at a sufficiently high level. A primary throttle valve is provided to control the quantity of fluid charge entering into the primary induction passage and a secondary throttle valve is provided to control the quantity of fluid charge entering into the secondary induction passage. The secondary throttle valve is coordinated with the primary throttle valve so that the secondary throttle valve will remain closed until the primary throttle valve opens wider than a predetermined opening degree. Under engine operating conditions when only the primary throttle valve opens, fluid charge from the primary induction passage will swirl at a high "swirl ratio" in the range of 1.5 to 6, while, under engine operating conditions when both the primary and secondary throttle valves open, fluid charge from the secondary induction passage will impede swirling motion of fluid charge from the primary induction passage to provide a low "swirl ratio" in the range of 0.5 to 1 within the cylinder, and to maintain a high volumetric efficiency of the engine.

12 Claims, 20 Drawing Figures

INTERNAL COMBUSTION ENGINE WITH DUAL INDUCTION SYSTEM

BACKGROUND OF THE INVENTION

The present invention relates to an internal combustion engine with dual induction system including a primary induction system to direct a first fluid charge into a cylinder to swirl therein under all operating conditions of the engine and a secondary induction system to direct a second fluid charge into the cylinder in such a direction as to impede and reduce the swirling motion of the first fluid charge issuing from said primary induction system under predetermined operating conditions of the engine, and maintain the volumetric efficiency of the engine at a high level under these predetermined operating conditions.

For the purpose of purification of exhaust gases resulting from combustion within an internal combustion engine, an air fuel mixture having a great air fuel ratio is burnt during the combustion or an air fuel mixture is burnt at an increased exhaust gas recirculation rate (EGR rate) during the combustion. Since flame propagation speed decreases as the air fuel ratio is increased or EGR rate is increased, it is necessary and known to increase the swirl rate within a combustion chamber of the engine to such a degree as to obtain fast burn combustion.

Various fuel mixture introductions have been employed to produce fuel mixture swirling within a cylinder, for example, complicated intake port shapes; or shrouded intake valves. If such a complicated induction arrangement is employed, the volumetric efficiency of the engine is impaired at high loads and as a result the power output under full or high load conditions drops.

Dual induction systems for internal combustion engines including dual passages and ports for the combustion chambers of internal combustion engines are known in the art. These dual induction systems include a small primary passage communicating with a primary side of a carburetor and with a small intake valve in a combustion chamber and a large secondary passage communicating with a secondary side of the carburetor and with a large intake valve in the combustion chamber. In these systems an air fuel mixture for engine operation at low and intermediate loads is supplied to the combustion chamber from the primary side of the carburetor through the small primary passages and a second air fuel mixture is supplied to the combustion chambers from the secondary side of the carburetor, too, when the internal combustion engine is operating under high load conditions, such as those that occur during peak acceleration periods and at wide open throttle.

These dual induction systems have several advantages over the conventional single induction systems currently used in internal combustion engines that employ a single induction passage leading from a carburetor to an intake valve located in a combustion chamber. At low and intermediate loads the air flow through the primary induction passages has a velocity sufficient to fully mix the fuel with the air. This action results in more complete burning of the fuel in each combustion of the internal combustion engine, thereby resulting in better engine operation and a reduction in the unburnt hydrocarbons and carbon monoxide emitted by the internal combustion engine.

With these dual induction systems, if the air fuel ratio is increased sufficiently to obtain lean burn combustion or the exhaust gas recirculation rate (EGR rate) is increased sufficiently to obtain a marked reduction in nitrogen oxides emitted by the internal combustion engine, the flame propagation speed within each combustion chamber of the internal combustion engine drops when the engine is operating at low crankshaft speeds under light load conditions, thereby resulting in poor engine operation.

SUMMARY OF THE INVENTION

The present invention includes a combustion chamber or a cylinder having a piston reciprocably mounted therein. A cylinder head is positioned over one end of the cylinder and a primary induction and secondary induction systems are provided for the cylinder. The primary induction system is operative under all of the engine operating conditions of the engine to direct a first fluid charge into the cylinder to swirl therein and a secondary induction system is operative only when the engine is operating under predetermined operating conditions of all to direct a second fluid charge into the cylinder in such a direction as to impede and reduce the swirling motion of the first fluid charge.

Since the swirling motion of the first fluid charge from the primary induction system is impeded with the second fluid charge from the secondary induction system in order to provide a swirling sufficiently low as to maintain the volumetric efficiency of the engine at a high level under the predetermined operating conditions of all of the engine, the swirling motion of the first fluid charge from the primary induction system can be increased high enough as to obtain lean burn combustion within the engine or to obtain stable combustion with heavy EGR under the operating conditions of the engine other than the predetermined operating conditions of the engine.

An object of the present invention is to provide an internal combustion engine with dual induction system which is effective to obtain lean burn combustion within the engine or stable combustion with heavy EGR within the engine.

Another object of the present invention is to provide an internal combustion engine with a dual induction system which is effective to obtain a sufficiently high swirling motion within a cylinder enough to provide fast burn combustion of a lean air fuel mixture or a fuel mixture with heavy EGR during engine operating conditions when a primary induction system only is operative and effective to reduce the swirling motion within the cylinder during engine operating conditions when a secondary induction system also becomes operative, to a suitable low level and maintain a sufficiently high volumetric efficiency of the engine under these operating conditions.

Other objects of the present invention will become more readily understood as the description proceeds in connection with the accompanying drawings.

BRIEF DESCRIPTION OF THE DRAWINGS

FIG. 5 is a graph showing the relationships between the "swirl ratio" ($\phi$) and Ap/At, the relationships between the efficiency of resistance to induction ($C_v$) and Ap/At, and the relationships between HC emission and Ap/At;

DESCRIPTION OF THE PREFERRED EMBODIMENTS

Figure 1:
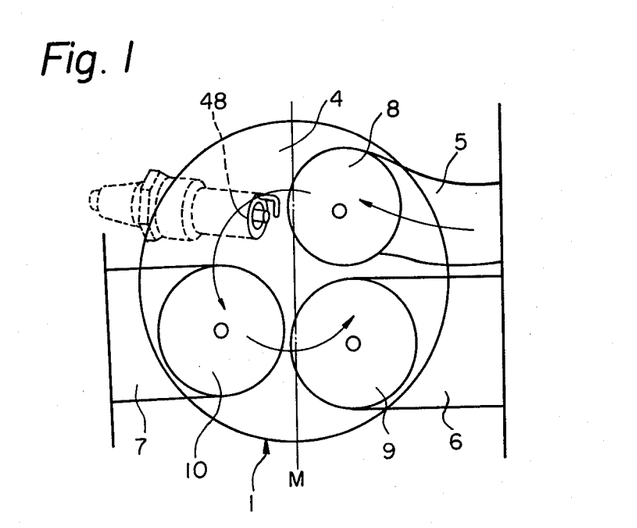
FIG. 1 is a diagrammatic plan view of a first preferred embodiment of an interal combustion engine according to the present invention and shown in FIG. 2.
Figure 2:
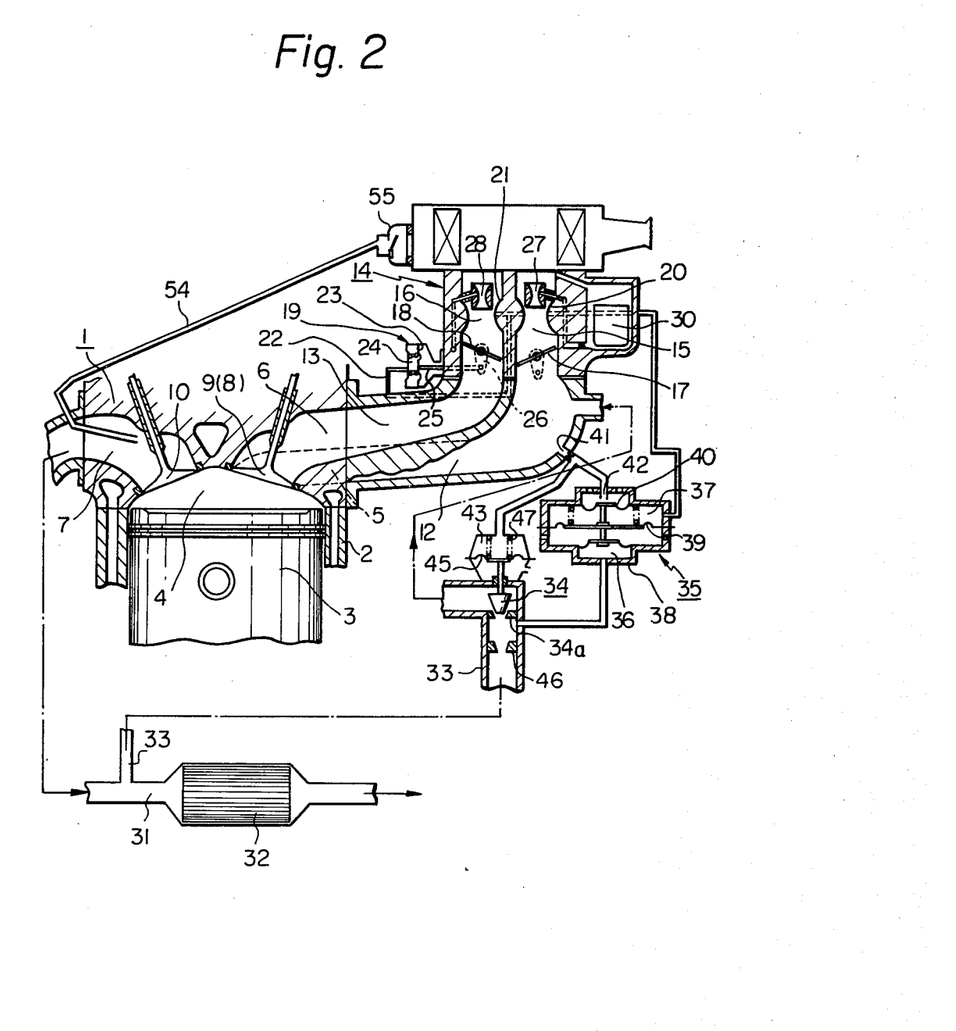
FIG. 2 is a diagrammatic sectional view of the engine shown in FIG. 1, a dual induction system, an exhaust system, an exhaust gas recirculation (EGR) system, and a secondary air supply system.

Referring to FIGS. 1 and 2, a four-cycle spark ignition reciprocatory internal combustion engine is shown which has a cylinder head 1 positioned over one end of each cylinder formed in a cylinder block 2. A piston 3 is reciprocably mounted within each cylinder of the cylinder block 2 to define a hemispherical combustion chamber 4. The entire combustion chamber 4 is formed by the clearance volume between the upper surface of the piston 3 and the lower surface of the cylinder head 1.

The cylinder head 1 has a primary induction passage or primary intake port passage 5, a secondary induction passage or secondary intake port passage 6, and an exhaust port passage 7. The primary and secondary passages 5 and 6 extend inwardly and downwardly through the cylinder head 1 from one side wall thereof toward a primary intake valve 8 and a secondary intake valve 9, respectively. These valves 8 and 9 are operated to open concurrently by the usual means (not shown).

The cross-section of the primary intake port passage 5 is made smaller than the secondary intake port passage 6. The exhaust passage 7 extends inwardly and downwardly through the cylinder head 1 from the opposite side wall thereof toward an exhaust valve 10 which is operated in the conventional manner by the usual means (not shown). As shown in FIG. 1, the intake valves 8 and 9 are arranged within an area on the same side from a center line M, with which the cylinder axes of the cylinders of the cylinder block 2 intersect, and the exhaust valve 10 arranged within an area on the opposite side from the center line M.

The primary intake port passage 5 that carries air fuel mixture throughout all of the operating conditions of the engine is so shaped as to direct air fuel mixture tangentially into the cylinder to swirl therein around the cylinder axis. More specifically, viewing in FIG. 1, the line passing through the central portions of the primary intake passage 5 is so curved as to allow the primary intake passage 5 to discharge the air fuel mixture tangentially into the cylinder. Viewing in FIG. 2, an angle of the direction of the air fuel mixture issuing from the primary passage 5 with respect to a plane perpendicular to the cylinder axis is made small so as to reduce its axial component, along the cylinder axis, of a velocity of the air fuel mixture issuing from the primary passage 5.

Alternatively, the other introduction arrangement to produce a swirling action for the air fuel mixture within the cylinder may be employed, such as a shrouded primary intake valve or a primary intake port passage with a bank therein.

The secondary intake port passage 6 that carries air fuel mixture at high loads is so shaped as to direct air fuel mixture, in such a direction as to impede and reduce the swirling motion of the air fuel mixture issuing from the primary intake passage 5. Viewing in FIG. 2, an angle of the direction of the air fuel mixture issuing from the secondary passage 7 with respect to the plane perpendicular to the cylinder axis is made large so as to admit the air fuel mixture efficiently into the combustion chamber 4 during operating conditions of the engine at high speeds with high loads.

The swirling motion of air fuel mixture within the combustion chamber 4 is maximum during engine operation at low speeds with low loads, but, during engine operation at high speeds with high loads, the swirling motion of the air fuel mixture decreases along with the enhanced volumetric efficiency of the engine and thermal effeciency thereof.

Figure 3:
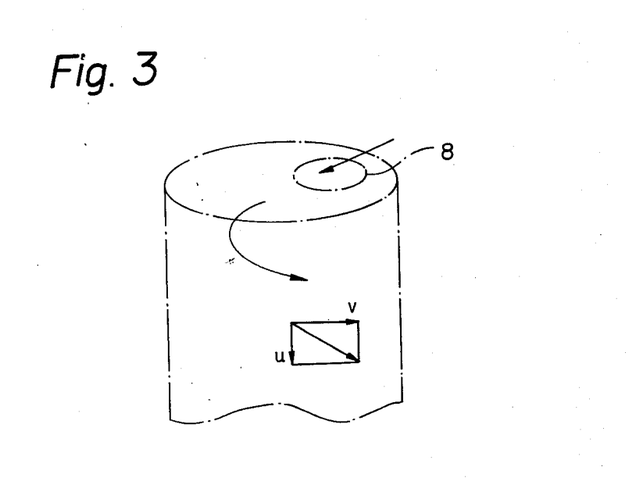
FIG. 3 is a diagrammatic view showing flow of fluid into a cylinder of the engine shown in FIG. 1.
Figure 4:
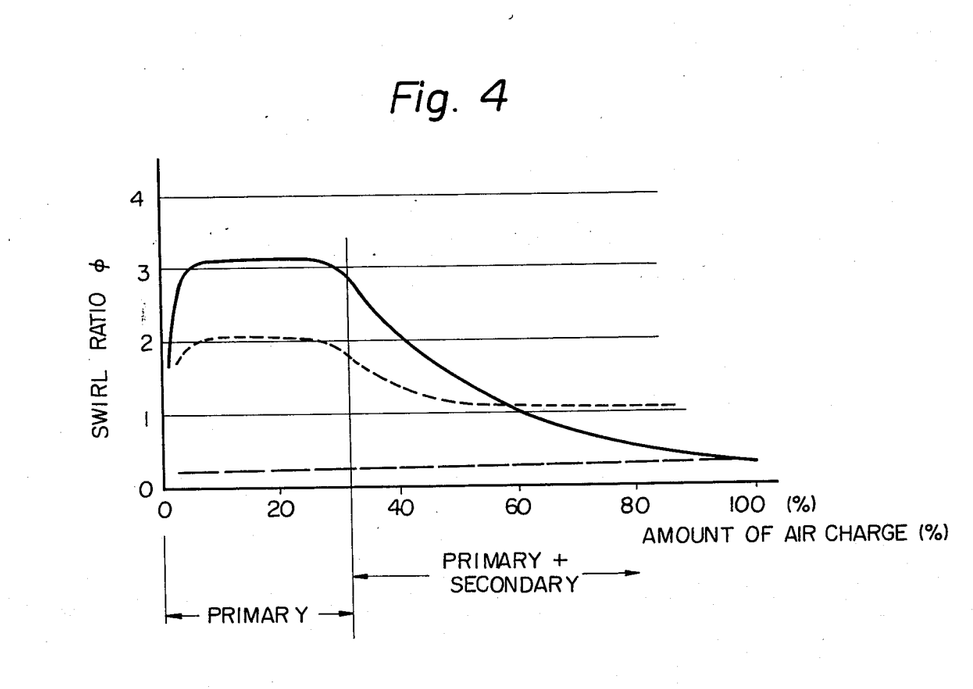
FIG. 4 is a graph showing the relationships between the "swirl ratio" ($\phi$) of the charge within the cylinder and the amount of charge within the cylinder (%)

This will be explained more particularly hereinafter in connection with FIG. 3. In FIG. 3, the letter v denotes a component vector representing a tangential component of an angular velocity of the swirling air fuel mixture within the combustion chamber 4, while, the letter u a component vector representing an axial component along the cylinder axis of the angular velocity. Taking a ratio v/u and calling this ratio as a "swirl ratio", good combustion has been obtained when the "swirl ratio" $v/u \approx 1.5$ to 6 during engine operation at low and intermediate speeds with low and intermediate loads in which air fuel mixture flowing into the combustion chamber 4 issues from the primary intake port passage 5 only and when the "swirl ratio" $v/u \approx 0.5$ to 1 during engine operation at high speeds with high loads in which air fuel mixture issues from the secondary intake port passage 6 also in such a manner to reduce the swirling motion of air fuel mixture issuing from the primary intake port passage 5 (ref. FIG. 4). Combustion has been an acceptable level when the "swirl ratio" for engine operation at high speeds with high loads is approximately ½ or half of the "swirl ratio" for engine operation at low and intermediate speeds with low and intermediate loads. Of course, the "swirl ratio" for the engine operation at low and intermediate speeds with low and intermediate loads shall be in the range mentioned as above, from approximately 1.5 to 6, so that the "swirl ratio" for the engine operation at high speeds with high loads shall be in the range from approximately 0.75 to 3. The maximum of the range for the "swirl ratio" for the low and intermediate speed engine operation conditions is set around 6 because if the "swirl ratio" for these engine operation conditions becomes a larger value, such as a value within 6 and 10, the resistance to induction of air flow will increase excessively and the swirling motion of air fuel mixture within combustion chamber 4 will increase its swirl rate too high to cause harsh combustion and quenching of the combustion flame will result.

When determining the "swirl raito", the following factors also have to be taken into account in addition to the shape of the intake port passage 5, such as the effective diameter of the intake valve 8 and its lift which are important factors to determine the inflowing velocity of air fuel mixture flowing into the combustion chamber 4 from the intake port passage 5.

For example, if the effective area through the primary intake valve 8 as it opens (Ap) (the effective area being a function of the valve diameter and the valve lift) is one fourth (¼) of that of a single intake valve of the current internal combustion engine, the inflowing velocity of air fuel mixture from the primary intake valve 8 will be approximately four times as high as that of air fuel mixture from the single intake valve.

The total (At) of the effective area of the primary intake valve 8 and that of the secondary intake valve 9 as they open will be set approximately equal to the effective area of a single intake valve as it opens, of the current internal combustion engine having the same specifications in which air fuel mixture comes into a combustion chamber from a single intake port passage cooperating with the single intake valve. The ratio of the diameter of the primary intake valve 8 to the diameter of the secondary intake valve 9 is preferably within a range between 1:1 and 1:2. Under this condition, the velocity of inflowing air fuel mixture coming from the primary intake port passage can be increased sufficiently to provide a desired swirling for the air fuel mixture within the combustion chamber 4.

Figure 5:
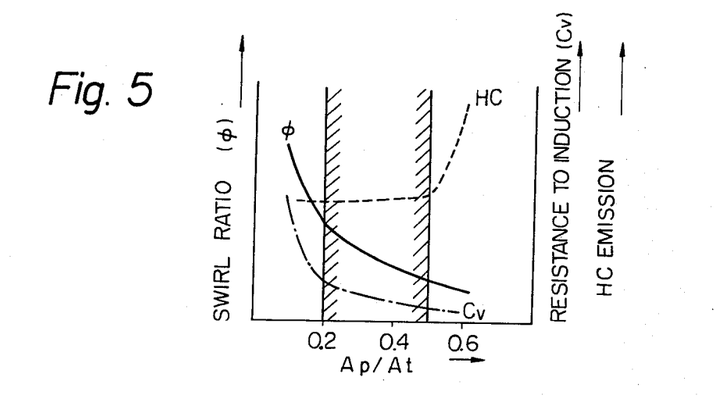

Setting the ratio of the diameter of the primary intake valve 8 to the diameter of the secondary intake valve 9 within the range as above, a ratio Ap/At of the effective valve opening area Ap of the primary intake valve 8 to the total. At of the effective valve opening area of the primary intake valve 8 and that of the secondary intake valve 9 will fall within a range $0.2 \leq Ap/At \leq 0.5$. As clearly shown in FIG. 5, when the ratio Ap/At falls within the range mentioned as above, the emission of HC and the efficiency of resistance to induction Cv are sufficiently low. If it is desired to increase the velocity of inflowing air fuel mixture coming from the primary intake port passage 5, the valve lift for the primary intake valve 8 is set smaller than the valve lift for the secondary intake valve 9.

Since the life of the swirling motion within the combustion chamber 4 increases as the velocity of inflowing air fuel mixture from the primary intake port passage 5 increases, the ratio of the diameter of the primary intake valve 8 to the diameter of the secondary intake valve 9 should be set within the before mentioned range in order to sustain the swirling motion until the final stage of the compression stroke of the piston 3.

Intake manifold passages 12 and 13 have one end thereof communicating with the intake port passages 5 and 6, respectively, and have opposite ends communicating with a primary induction passage 15 and a secondary induction passage 16 of a two barrel compound carburetor 14.

A primary throttle valve 17 of the carburetor 14 is operatively connected with an accelerator pedal, not shown, through a mechanical linkage, not shown, so as to be actuated by the manipulation of the accelerator pedal, while, a secondary throttle valve 18 is actuated by a diaphragm device 19 in such a manner that the opening of the secondary throttle valve 18 commences after the primary throttle valve 17 has been opened sufficiently.

The diaphragm device 19 is operable in response to the resultant vacuum from venturi vacuums within a primary venturi 20 and with a secondary venturi 21, respectively. A vacuum or power chamber 24 divided from an atmospheric chamber by a diaphragm communicates with both the venturies 20 and 21 via a vacuum passage 22 so as to introduce thereinto the vacuums within the primary and secondary venturies 20 and 21. An actuator rod 25 fixedly mounted at one end to the diaphragm 23 is linked to a shaft lever 26 and a spring disposed in the vacuum chamber 24 urges the actuator rod 25 and the secondary throttle valve 18 toward the illustrated position as long as the resultant vaccum introduced into the vacuum chamber 24 is lower than a predetermined level. When the engine operates at high speeds with high loads in which the resultant vacuum is higher than the predetermined level, the secondary throttle valve 18 will be opened as the resultant venturi vacuum increases.

In FIG. 2, numerals 27 and 28 denote fuel nozzles communicating with the primary and secondary venturies 20 and 21, respectively. These fuel nozzles communicate with a float chamber 30.

For the engine operation at low and intermediate speeds with low and intermediate loads in which the primary throttle valve 17 only is operative to open, the air fuel ratio A/F is set at a value within the range between 13 and 22 to effect lean burn combustion in the engine and to improve fuel economy. Preferably, the air fuel ratio A/F of the air fuel mixture charge within the combustion chamber 4 is set approximately at 15 which is slightly greater than or weaker than the stoichiometry ($A/F \approx 14.7$) taking into account the rate of exhaust gas recirculation which will be specifically described later.

For the engine operation at high speeds with high loads in which the resultant mixture coming from the primary and secondary intake port passages 5 and 6 is burnt, the air fuel ratio A/F of the air fuel mixture charge within the combustion chamber 4 is set at a value within the range between 12 and 18 so as to cause the engine to yield sufficiently high power output. Preferably, the air fuel ratio A/F is set at a value within the range between 13 and 14.

When the engine operates with only the primary throttle valve 17 opening, the exhaust emissions have been reduced considerably without deteriorating the fuel economy because under this engine operating condition, owing to sufficiently high swirling motion, the stable combustion of the charge including high rate of exhaust gases and lean air fuel mixture is possible.

When the engine operates at high loads in which the secondary intake valve 18 also becomes operative to supply air fuel mixture to the engine, the power output at fully open throttle from the engine has been increased to a sufficient level because the air fuel mixture charge within the combustion chamber 4 is enriched and the swirling motion within the combustion chamber 4 is reduced along with a reduction in the resistance to induction.

Figure 6:
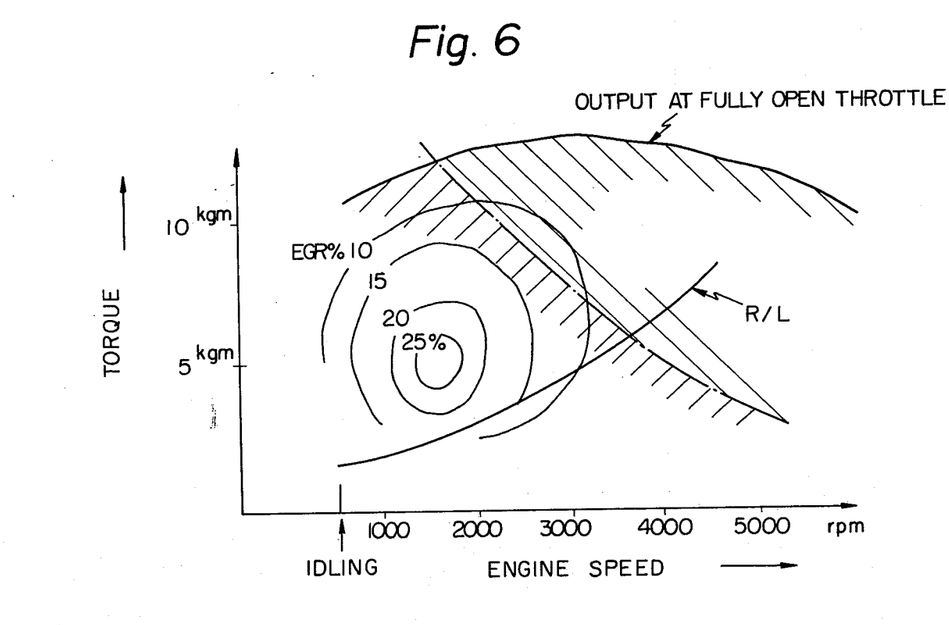
FIG. 6 is a graph showing the performance of the engine shown in FIGS. 1 and 2.

The exhaust gas recirculation is controlled on a pattern as scheduled, one example being shown in FIG. 6. FIG. 6 shows the performance of the engine on which the scheduled pattern of the exhaust gas recirculation is illustrated.

Referring to FIG. 2, connected to an exhaust pipe 31 at a location upstream of a catalytic device or converter (oxidation catalytic converter) 32 is an exhaust gas recirculation (EGR) conduit 33. The EGR conduit 33 leads from the exhaust pipe 31 toward the primary manifold passage 12 to pass a portion of exhaust gases flowing through the exhaust pipe 31 toward the primary manifold passage 12. An exhaust gas recirculation control valve member 34 is disposed in the EGR conduit 33 and cooperates with a valve seat 34a provided in the EGR conduit 33. The flow of exhaust gases passing through the EGR conduit 33 is controlled in accordance with the opening degree provided by the EGR control valve member 34.

As will be understood from FIG. 6, the EGR rate is maximum (for example 25%) when the engine operates at low and intermediate speeds with low and intermediate loads, and decreases gradually as the engine speed increases or decreases from the engine operation at low and intermediate speeds if the engine torque is the same or as the engine torque increases or decreases from the engine operation at low and intermediate speeds if the engine speed is the same. Preferably, the EGR rate shall be controlled on a schedule as above. For this end, there is provided a control valve 35 for providing a vacuum signal on which the EGR control valve 34 is operable. The control valve 35 controls or regulates the level of the vacuum signal in response to exhaust gas pressure and venturi vacuum.

The control valve 35 (see FIG. 2) comprises a compensating pressure chamber 36 communicating with a location within the EGR conduit 33 between the valve seat 34a cooperating with the EGR control valve member 34 and an orifice 46 providing in the EGR conduit 33 upstream of the valve seat 34a, and a power pressure chamber 37 communicating with the primary venturi 15 to introduce therein the venturi vacuum created therewithin. It also comprises three mutually linked diaphragms 38, 39 and 40 and a vacuum conduit 41 having one end opening into the primary manifold passage 12 and an opposite end 42 disposed in a pressure regulating chamber above the diaphragm 40 vented to the atmosphere via openings, no numerals, and the opposite end 42 of the vacuum conduit 41 is positioned sufficiently near a valve member portion on the diaphragm 40 to be valved thereby. A conduit branching from the vacuum conduit 41 between an orifice positioned within the conduit 41 and the opposite end 42 leads to a vacuum power chamber 43 for the EGR control valve 34. The amount of air admitted into the vacuum conduit 41 toward the vacuum power chamber 43 is controlled in response to the opening or closing of the opposite end 42 by the valve member portion on the diaphragm 40. In this manner, the vacuum signal applied to the vacuum power chamber 43 for the EGR control valve 34 is controlled.

With the vacuum signal as controlled by the control valve 35, the EGR control valve 34 is actuated by a diaphragm 45 responsive to this vacuum signal to vary its valve opening degree in such a manner that as the venturi vacuum within the primary venturi 51 increases the pressure downstream of the orifice 46 and upstream of the valve seat will decrease. This means that the pressure downstream of the orifice 46 and upstream of the valve seat 34a will decrease as the intake air flow through the primary venturi 15 increases.

With the EGR control valve 34, the amount of exhaust gases passing through the EGR conduit 33 will vary in proportion to the difference in pressure between the back pressure upstream of the orifice 46 and the pressure within an area downstream of the orifice 46 and upstream of the valve seat 34a. Since the exhaust back pressure varies in proportion to a variation in amount of intake air flow through the primary venturi 15, the amount of exhaust gases to be recirculated will vary in response to the intake air flow.

In order to compensate for the variation of the amount of recirculated exhaust gases owing to the variation in the engine intake vacuum transmitted to the downstream area within the EGR conduit 33 of the EGR control valve member 34, the pressure within the area downstream of the orifice 46 and upstream of the valve seat 34a is fed to the compensating pressure chamber 36. An increase in the engine induction vacuum, for example, which will induce the excessive recirculation of the exhaust gases, will cause the diaphragm 38 to be lowered so that the vacuum signal applied to the chamber 43 will be lowered, thereby causing the EGR control valve 34 to narrow or reduce the valve opening thereof.

When the engine operates under a condition in which the amount of intake air through the primary venturi 15 is small (the engine operating condition at low speeds with low loads), the valve opening degree of the EGR valve member 34 is maintained smaller than a low level under the action of a preset diaphragm spring 47 so that the EGR rate under this engine operating condition is little as shown in FIG. 6. When the engine operates under a condition in which the amount of intake air through the primary venturi vacuum 15 is large (the engine operating condition at high speeds with high loads), the flow velocity through the orifice 46 will reach the sonic velocity so that the EGR rate will decrease, as shown in FIG. 6. This is because even if the air flow further increases, the amount of exhaust gases passing through the orifice 46 can not increase as the flow velocity reaches the sonic velocity.

The advantage derived from the fact that a portion of the exhaust gases is recirculated and introduced into the primary manifold passage 12 is that the amount of fluid flow through the primary manifold passage 12 will be increased accordingly to the amount of exhaust gases introduced into the primary manifold passage 12 so that the swirling motion can be strengthened accordingly. As a result, this contributes much to the combustion stability.

If desired, a portion of exhaust gases may be introduced into the secondary manifold passage 13, too. If the exhaust gases are introduced into the secondary manifold passage 13, the intake vacuum at the secondary intake port passage 6 will be relieved or decreased, thereby contributing much in preventing reverse flow into the port passage 6. However, if the recirculated exhaust gases are introduced into the secondary manifold passage 13, too, the charge from the secondary manifold passage 13 will impinge on that from the primary manifold passage 12 strongly, as compared to the case in which the exhaust gases are not introduced into the secondary manifold passage 13, thereby effectively reducing swirling motion within the combustion chamber 4. The relationship between the EGR rate and A/F differs from vehicle to vehicle depending upon its use. For example, for a vehicle designed for use in urban area in which NOx regulation level is severe, the EGR rate is set at approximately 20% and A/F between 13 and 17, while, for a vehicle designed for use in rural area in which the NOx regulation is not so severe, the EGR is approximately 10% and A/F between 16 and 18.

Referring to the location of a spark plug 48, the spark plug 48 is mounted to the cylinder head with its electrode communicating with the combustion chamber 4 at the inclined wall opposite to the inclined wall where the primary intake valve 8 is arranged to provide an arrangement whereby the swirling air coming from the intake port passage 5 will impinge on the spark plug electrode to scavenge an area around the same.

Figure 7:
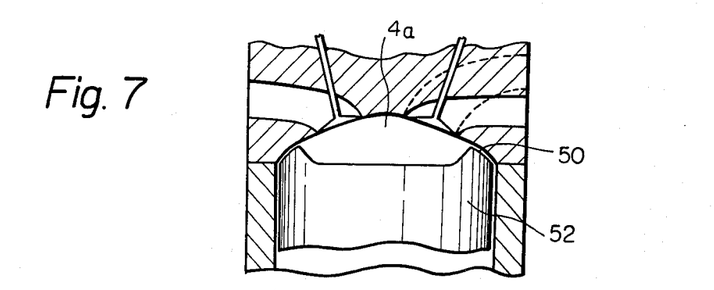
FIGS. 7 and 8 are diagrammatic sectional views showing modified combustion chamber designs of the engine in FIG. 2, respectively.
Figure 8:
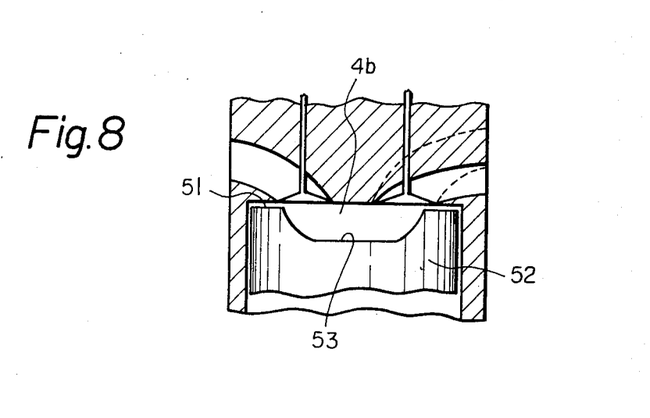

If desired, satisfactory operation of the engine is possible with a combustion chamber 4a of hemispherical design (see FIG. 7) or a combustion chamber 4b (see FIG. 8). Each of these combustion chambers 4a and 4b is formed by a body of revolution of a figure around the cylinder axis so that the charge will swirl even when a piston 52 ascends and approaches the top dead center position during the compression stroke.

In order to cause the charge to swirl at an increased rate at the end of compression stroke, a squish area, such as shown in FIGS. 7 and 8 at 50 and 51, respectively, is provided to force the mixture toward the cylinder center at the end of compression stroke.

In the case of the combustion chamber 4a as shown in FIG. 7, the cylinder head has a wall defining a spherical depression and the piston has a flat surface at its top with a ring section surrounding the flat surface. The ring section of the piston and the wall of the cylinder head defining the spherical depression define therebetween an annular squish area 50.

In the case of the combustion chamber 4b as shown in FIG. 8, the combustion chamber 4b is formed by the clearance volume between the lower flat surface of cylinder head and the upper surface of the piston 52 and by a cavity 53 formed in the piston 52.

Since if the squish area, such as 50 or 51, is excessively large it may cause an excessively strong squish action so as to quench combustion flame, the appropriate amount of area of the squish area should be determined taking into account the effect of the swirling action of the flow of movement of the mixture.

The operation of the previously described engine is as follows:

When the engine operates at low and intermediate speeds with low and intermediate loads, the admission of air fuel mixture is effected via the primary intake port passage 5 because the primary throttle valve 17 only is open under this engine operating condition.

Under this condition, because the intake port passage 5 serves as a swirl port to give the inflowing mixture flow a force so as to cause it swirl within the combustion chamber 4 and because the velocity of the inflowing mixture is increased sufficiently by the reduced effective opening area of the intake valve 8, the sufficiently strong swirling of the mixture charge within the combustion chamber 4 will be sustained during compression stroke. With this strong swirling motion, the fuel droplets will be evaporated satisfactorily. Since the swirling motion will be sustained until the beginning of expansion stroke, the flame propagation will be accelerated. As a result of these, stable combustion takes place at low and intermediate speeds with low and intermediate loads.

Since, as explained above, the combustion environment is improved, stable combustion with lean mixture than the stoichiometry or stable combustion of air fuel mixture having A/F of around 15 with heavy EGR is possible. Consequently, it is possible to considerably reduce the toxic components of exhaust gases, mainly NOx, from the engine while the engine operates at low and intermediate speeds with low and intermediate loads (this operating range is frequently used) with good drivability and fuel economy.

When the air fuel mixture charge is supplied from the secondary air port passage 6, too, as the engine enters into engine operating condition at high speeds with high loads when the secondary throttle valve 18 begins to open, the air fuel mixture flow from the secondary port passage 6 will be directed into the combustion chamber 4 to impede and reduce swirling motion of air fuel mixture from the primary port passage 5. As a result, swirling motion within the combustion chamber 4 will be considerably reduced under this high speed high load engine operating condition.

Since the secondary intake port passage 6 has a large angle with respect to a plane normal to the cylinder axis, as compared to the primary intake port passage 5, the efficiency of induction of air fuel mixture through the secondary air intake port passage 6 is higher than that through the primary air intake port passage 5. Since the amount of mixture supplied from the secondary intake port passage 6 is larger than that from the primary intake port passage 5, the efficiency of induction during the engine operation at high speeds with high loads is increased as compared to that during the engine operating condition in which only the primary intake port passage 5 is operable.

If, under high speed high load engine operating condition, swirling motion within the combustion chamber 4 were increased up to the same level as that suitable for the engine operation at low speeds, the combustion would take place at an excessively fast rate so as to cause a substantial portion of heat generated by the combustion to be dissipated toward the body of the engine. As a result, a cooling loss increases accordingly to increase the heat transfer toward the engine coolant.

It will now be understood that since the inflowing mixture from the secondary intake port passage 6 functions to impede and reduce swirling motion within the combustion chamber 4 under the engine operating condition at high speeds with high loads, the heat loss through the cooling system of the engine will be decreased, thus enhancing the thermal efficiency of the engine under this condition.

It is therefore possible to cause the engine to yield a power output high enough to fall above or on the acceptable level under engine operation around the wide open throttle because of an increase in the volumetric efficiency of the engine and because of a reduction in heat loss.

In order to increase the volumetric efficiency, the valve overlap between the secondary intake valve 9 and the exhaust valve 10 shall preferably be large. The valve overlap between the primary intake valve 8 and the exhaust valve 10 shall preferably be small or zero in order to reduce residual exhaust gases within the cylinder so as to stabilize the combustion at low speeds with low loads.

In order to satisfy the above requirements two separate independent valve actuating mechanisms (cam, rocker arm) are necessary for intake valves 8 and 9, respectively, thus increasing the complexity. So, if it is desired to avoid this complexity, the valve timings of the primary and secondary intake valves 8 and 9 are set at the same timing which is intermediate a suitable timing of the primary intake valve 8 for satisfying the preferable relationships with exhaust valve 10 and a suitable timing for the secondary intake valve 9 for satisfying the preferable relationships with the exhaust valve 10, and a bifurcated rocker arm having two fingers for operative abutting contact with the primary and secondary intake valves 8 and 9, respectively, is used to simultaneously actuate these valves.

It will be understood that formation of NOx is lowered due to combustion with heavy EGR or lean burn combustion. Further reduction in HC and CO is accomplished by oxidation reaction in a catalytic converter 32.

For supplying secondary air into exhaust gases when air fuel ratio is set richer than the stoichiometry, a secondary air supply passageway 54 is connected at its one end to the exhaust pipe 31 and a reed valve 55 is provided. The reed valve 55 is responsive to pressure pulsation of the exhaust gases to perit induction of atmospheric air into the exhaust gases.

Figure 9:
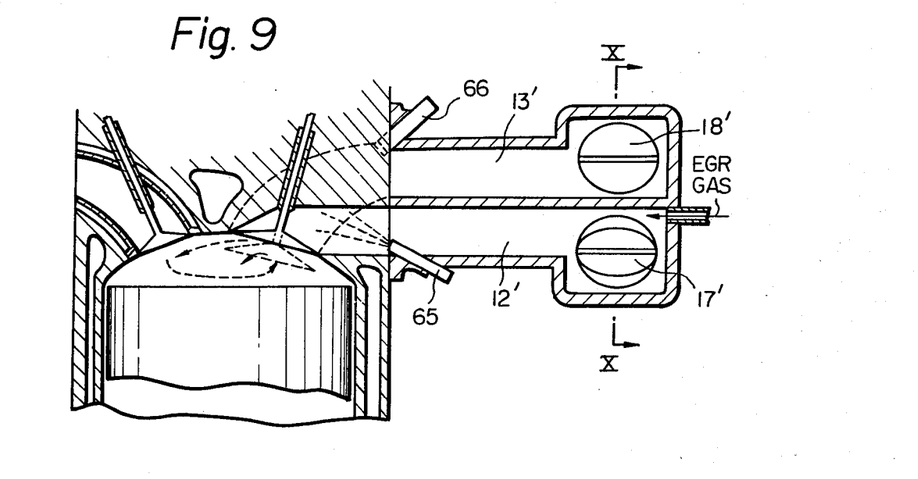
FIG. 9 is diagrammatic sectional view of an internal combustion engine shown in FIG. 1 and a dual induction system with fuel injectors arranged to discharge fuel into the primary and secondary port passages positioned within the cylinder head.
Figure 10:
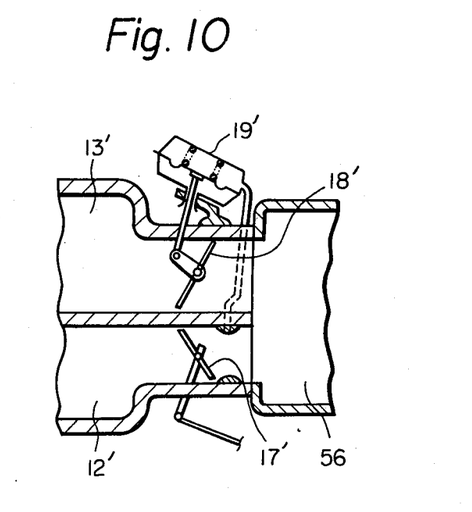
FIG. 10 is a sectional view taken through the line X—X shown in FIG. 9.

Referring to FIGS. 9 and 10, another embodiment will be described in which instead of a carburetor 14 a fuel injection system is used.

Fuel injectors 65 and 66 are provided for a primary manifold passage 12' and a secondary manifold passage 13', respectively. Although not shown, a fuel injection control circuit provides a fuel injection pulse in the conventional manner to these fuel injectors 65 and 66 to cause them to discharge fuel in accordance with the quantity of induction air.

The fuel injector 65 for the primary manifold passage 12' is operative throughout all engine operating conditions to discharge fuel, but the fuel injector 66 for the secondary manifold passage 13' is not operative while a secondary throttle valve 18' is closed. The fuel injector 66 is operative during the engine operating condition in which the secondary throttle valve 18' opens.

The mode of operation of the primary throttle valve 17' and that of the secondary throttle valve 18' are substantially the same as the counterparts of the carburetor 14. As shown in FIG. 10, an air flow sensor is provided upstream of these throttle valves 17' and 18' to detect the quantity of induction air fed to the engine.

The fuel injector 66 for the secondary may be eliminated so that the fuel will be supplied from the fuel injector 65 only. If the fuel injector 66 is eliminated, the control of the quantity of fuel injection in accordance with the quantity of induction air will be simplified. If two fuel injectors 65 and 66 are provided, it is necessary to control the total of the amount of fuel injection from the fuel injector 65 and that from the fuel injector 66 in accordance with the amount of induction air, thus complicating the control circuit.

Figure 11:
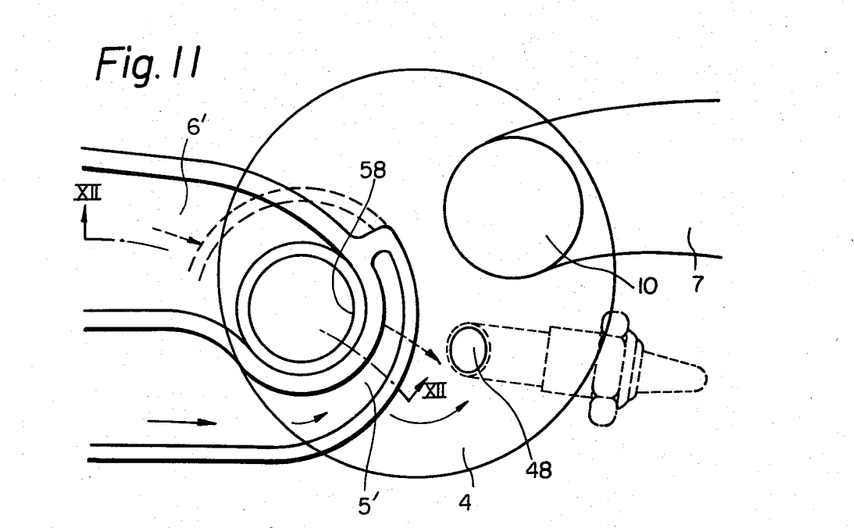
FIG. 11 is a diagrammatic plan view of a second preferred embodiment of an internal combustion engine according to the present invention with an intake valve and an exhaust valve removed.
Figure 12:
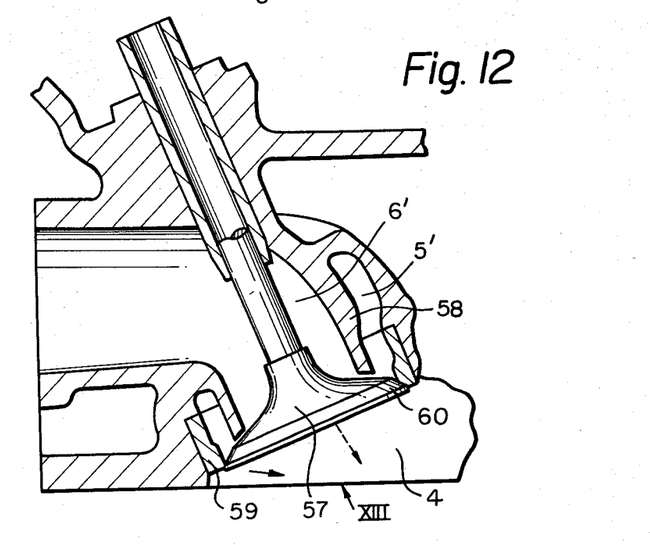
FIG. 12 is a partial sectional view taken through the line XII—XII shown in FIG. 11.
Figure 13:
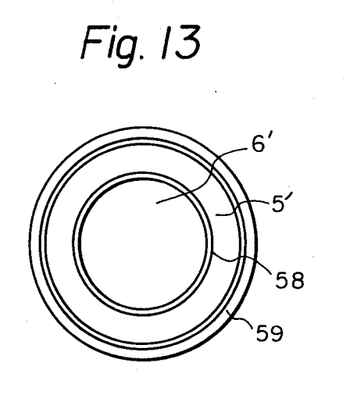
FIG. 13 is a view as viewed along an arrow XIII shown in FIG. 12 but the intake valve being removed.

FIGS. 11 to 13 show an embodiment in which a primary air intake port passage 5' and a secondary air intake port passage 6' are valved by a common intake valve 57.

An annular partition wall or short tube 58 is provided and the primary intake port passage 5' communicates with the exterior of the annular partition wall 58 and the secondary intake port passage 6' communicates with the interior of the annular partition wall 58. The primary intake port passage 5' thus communicates with the combustion chamber 4 at an annular port around the annular partition wall 58 and the secondary intake port 6' communicates with the combustion chamber 4 at a circular port within the annular partition wall 58. The primary intake port passage 5' is curved so as to direct air fuel mixture tangentially into the cylinder to swirl within the combustion chamber 4. The primary intake port passage 5' has a small angle with respect to a plane normal to the cylinder axis, as compared to the secondary intake port passage 6' for the same reason as explained with respect to FIGS. 1 and 2.

When the intake valve 57 is closed, an annular valve face 60 on the back of the valve member of the intake valve 57 firmly engages with a valve seat 60. The valve seat 60 is press fitted to the cylinder head in coaxial relationships with the annular partition wall 58. The annular partition wall 58 is out of engagement with the back face of the valve member of the intake valve 57 and when the valve 57 is in a closed position, so a small spaced remains between the end of the annular partition wall 58 and the valve member of the intake valve 57. However, this space is sufficiently small or narrow as to prevent mixing of fluid between the primary and secondary intake port passages.

Figure 14:
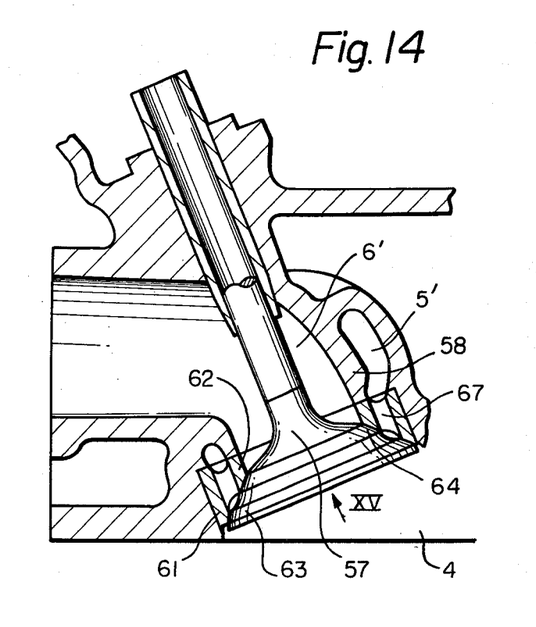
FIG. 14 is a similar view to FIG. 12 showing a modified part of a third embodiment of an internal combustion engine according to the invention.
Figure 15:
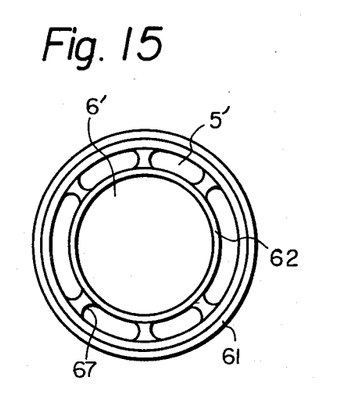
FIG. 15 is a view as viewed along an arrow XV shown in FIG. 14.

If desired, two valve seats 61 and 62, which are interconnected by a plurality of bridges 67 (see FIG. 15), are provided as shown in FIGS. 14 and 15. Valve member of an intake valve 57 is formed with two valve faces for cooperative tight engagement with the valve seats 61 and 62, respectively. When the intake valve 57 is closed, the primary and secondary intake port passages 5' and 6' are closed.

Using the intake valve as shown in FIGS. 11 to 13 or FIGS. 14 and 15 will contribute to the simplification of the valve operating mechanism of the engine.

Figure 16:
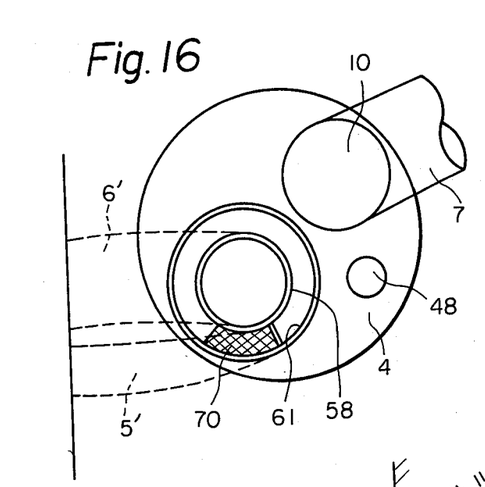
FIG. 16 is diagrammatic plan view of a fourth embodiment of an internal combustion engine according to the invention.
Figure 17:
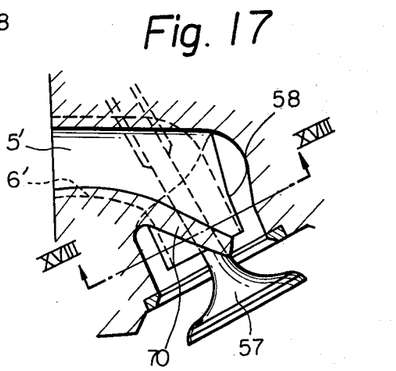
FIG. 17 is a partial sectional view of a portion of the engine shown in FIG. 16.
Figure 18:
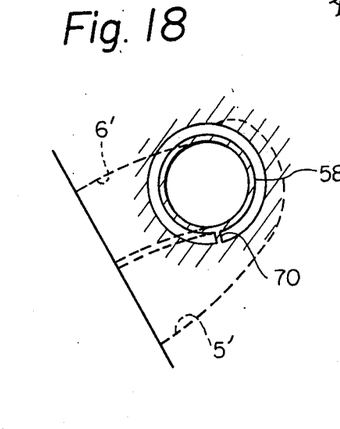
FIG. 18 is a sectional view taken through the line XVIII—XVIII shown in FIG. 17.

Preferably, as shown in FIGS. 16 to 18, a guide vane or wall 70 is arranged on the exterior of the annular partition wall 58 so as to direct air fuel mixture flowing through the primary intake port passage 5' to flow in one direction around the annular partition wall 58 on entering into the combustion chamber 4. With the provision of the guide wall 70, the portion of air fuel mixture which otherwise might flow around the annular guide wall in the opposite direction will be eliminated.

The guide wall 70 has an inclination as to cause the air fuel mixture to circulate around the annular partition wall 70 in one direction only.

Preferably, the guide wall 70 extends so that its trailing edge or downstream edge is positioned adjacent the back face of the intake valve 57 (see FIG. 17).

Figure 19:
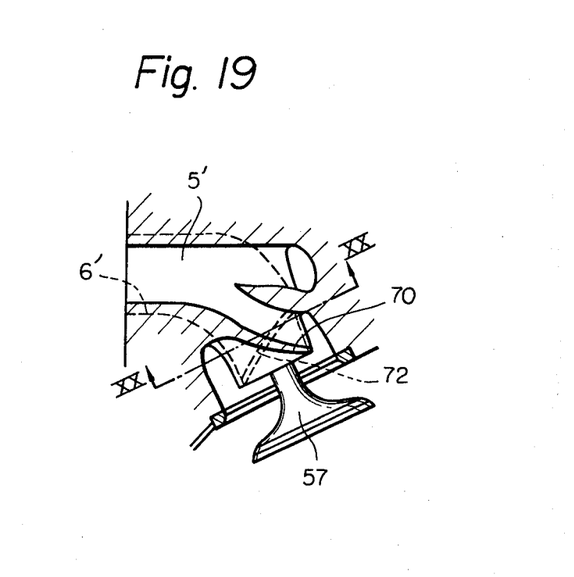
FIG. 19 is a sectional view similar to FIG. 17 showing a fifth embodiment of an internal combustion engine according to the invention.
Figure 20:
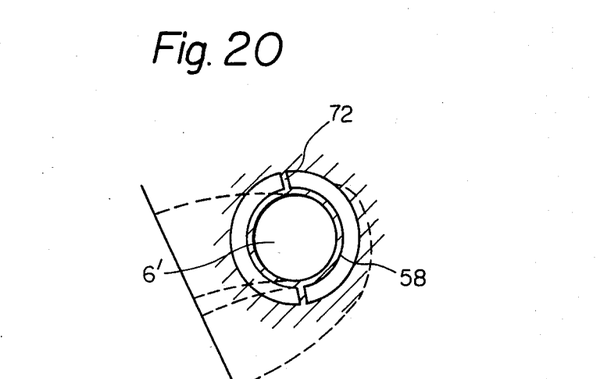
FIG. 20 is a sectional view taken through the line XX—XX shown in FIG. 19.

Preferably, another guide vane or wall 72 is arranged on the exterior of the annular partition wall 58 downstream of the guide wall 70 with respect to flow around the annular partition wall 58, as shown in FIGS. 19 and 20. With the provision of the another guide wall 72, swirling motion within the combustion chamber 4 is increased.

Although, in the embodiment shown in FIG. 2, the timing when the secondary throttle valve opens is adjusted in response to the engine load, it is possible to adjust the timing in response to vehicle speed or engine revolution speed or gear position of the associated transmission to the engine.

Preferably, the timing when the secondary throttle valve begins to open is when the quantity of induction air reaches from 30 percent to 40 percent of the maximum quantity of air which can be fed to the engine.

What is claimed is:

1. An internal combustion engine comprising a cylinder block having a cylinder form therein;
    said cylinder having an axis;
    a piston reciprocably mounted within said cylinder;
    a cylinder head positioned over one end of said cylinder;
    means defining a primary induction system having a primary passage and operable to direct a first fluid charge into said cylinder in a direction tangential with respect to the wall of said cylinder so as to cause said charge to swirl in said cylinder with said axis as the center of rotation, (fluid charge into said cylinder to swirl therein about said cylinder axis) under all of the operating conditions of the engines; and
    means defining a secondary induction system having a secondary passage and operable to direct the second fluid charge into said cylinder in such a direction as to impede the swirling motion of the first fluid charge and to provide a swirling about said axis which is sufficiently low to thereby maintain the volumetric efficiency of the engine at a sufficiently high level under predetermined operating conditions of the engine.

2. An internal combustion engine as claimed in claim 1,
    wherein said primary induction system defining means includes said cylinder head, a primary intake passage adpated to direct the first fluid charge into said cylinder and a primary intake valve reciprocably mounted therewithin to which said primary induction passage leads; and
    wherein said secondary induction system defining means includes said cylinder head, a secondary intake passage adapted to direct the second fluid charge into said cylinder, and a secondary intake valve reciprocably mounted therewithin to which said secondary induction passage leads.

3. An internal combustion engine as claimed in claim 1,
    in which said cylinder head has an intake valve reciprocably mounted therewithin, said intake valve including a stem and a head having a face, said cylinder head having a primary port, a valve seat around said primary port to define the outer periphery thereof and receiving said face, an annular wall means defining the inner periphery of said primary port, and a secondary port positioned within said annular wall means and defined thereby, said cylinder head having a primary intake passage therein in communication with said primary port and a secondary intake passage therein in communication with said secondary port.

4. An internal combustion engine as claimed in claim 3,
    including guide vane means positioned around said annular wall means to direct the first fluid charge to flow around said annular wall means in one rotational direction only.

5. An internal combustion engine as claimed in claim 4,
    in which said guide vane means includes a plurality of guide vanes positioned around said annular wall means.

6. An internal combustion engine as claimed in claim 4,
    in which said guide vane means includes a guide valve positioned around said annular wall means and said guide valve being inclined so as to direct the first fluid charge to flow in said one rotational direction only.

7. An internal combustion engine as claimed in claim 1,
    in which a "swirl ratio" under said predetermined operating conditions of the engine is not greater than one half of a "swirl ratio" under the operating conditions of the engine except said predetermined operating condition of the engine.

8. An internal combustion engine as claimed in claim 7,
    in which said first fluid charge has an air fuel ratio in the range from 13 to 22 and the resultant fluid charge of said first fluid charge and said second fluid charge has an air fuel ratio in the range from 12 to 18, and
    in which said first fluid charge includes a portion of exhaust gas issuing from the engine, the ratio of exhaust gas, in quantity, to said first fluid charge, in quantity under said predetermined operating condition is reduced as compared to that under the operating conditions of the engine except said predetermined operating condition.

9. In an internal combustion engine, means defining a cylinder having an axis, a piston, slidably disposed in said cylinder to define a variable volume combustion chamber, a dual induction system for said engine, said system comprising:
    a primary induction passage leading from the atmosphere to a first valve controlled inlet port for said combustion chamber, said primary induction passage and said first inlet port being so constructed and arranged as to operatively restrict the flow of air therethrough and introduce the air flowing therethrough into said combustion chamber at a high velocity in a direction tangential with respect to the wall of said cylinder whereby the so introduced air thereafter swirls around said axis of said cylinder;
    a fixed venturi disposed at the upstream end of said primary induction passage;
    a first throttle valve operatively disposed in said primary induction passage downstream of said venturi;
    a secondary induction passage leading from the atmosphere to a second valve controlled inlet port for said combustion chamber, said secondary induction passage and said second inlet port being so constructed and arranged as to have a lower restriction to the flow of air therethrough than said primary induction passage and first inlet port, and to introduce the air flowing therethrough into said combustion chamber at a lower velocity and in larger quantities than said primary induction passage and first inlet port and in a direction which slows the swirling of the air from said primary induction passage around said axis;

a second throttle valve operatively disposed in said second induction passage;

a pressure differential responsive motor fluidly connected with said venturi and operatively connected to said second throttle valve for moving same in response to the degree of vacuum prevailing at said venturi; and, means for introducing fuel into said secondary induction passage to form an air-fuel mixture richer than the one formed in said primary induction passage.

10. An internal combustion engine as claimed in claim 9, in which said primary induction system further comprises:

an EGR system for recirculating exhaust gases expelled from said combustion chamber back to said primary induction passage, said EGR system comprising an EGR control valve operable for metering the amount of EGR gas recirculated to said primary induction passage, said EGR control valve having a vacuum motor which is fluidly connected to said primary induction passage; and, a control valve for modulating the vacuum fed from said primary induction passage to said vacuum motor, said control valve being responsive to a first pressure signal indicative of the amount of air inducted through both of said primary and secondary induction passages, and to a second pressure signal indicative of the amount of exhaust gas being recirculated to said primary induction passage and the ambient atmospheric pressure.

11. A method of operating an internal combustion engine, comprising the steps of:

inducting air through a primary induction passage which restricts the flow of air therethrough thus increasing the velocity of the air flowing therein;

introducing the high velocity air into a combustion chamber of said engine via a first inlet port in a direction tangential with respect to the wall of a cylinder which forms part of said combustion chamber thus inducing the air to swirl in said combustion chamber about the axis of said cylinder;

sensing the vacuum prevailing at a fixed venturi formed in said primary induction passage;

throttling a secondary induction passage which has a lower restriction to the flow of air therein than said primary induction passage in accordance with the vacuum sensed;

inducting air through said secondary induction passage at a lower velocity and in larger quantities than that inducted through said primary induction passage;

introducing the air from said secondary induction passage into said combustion chamber via a second inlet port;

slowing the swirl of the air from said primary induction passage about said axis via introducing the air from said secondary induction passage; and, introducing fuel into said primary and secondary induction passages to form a lean air fuel mixture in said primary induction passage and a richer than the aforesaid lean air fuel mixture in said secondary induction passage.

12. A method of operating an internal combustion engine as set forth in claim 11, further comprising the steps of:

recirculating exhaust gas emitted from the combustion chamber back into said primary induction passage;

metering the amount of exhaust gas recirculated via an EGR control valve which has a vacuum motor fluidly connected to said primary induction passage; and, modulating the vacuum fed to said vacuum motor from said primary induction passage with a control valve controlled via a first pressure signal indicative of the amount of air inducted through both of said primary and secondary induction passages, and a second pressure signal indicative of the amount of exhaust gas being recirculated to said primary induction passage and the ambient atmospheric pressure.

* * * * *

UNITED STATES PATENT OFFICE
CERTIFICATE OF CORRECTION

PATENT NO. : 4,270,500
DATED : June 2, 1981
INVENTOR(S) : Yasuhiko Nakagawa et al.

It is certified that error appears in the above-identified patent and that said Letters Patent are hereby corrected as shown below:

Column 5, line 21, change "raito" to --ratio--.

Column 13, lines 23 and 24, delete "(fluid charge into said cylinder to swirl therein about said cylinder axis)".

Signed and Sealed this

Thirtieth Day of March 1982

|SEAL|

Attest:

Attesting Officer

GERALD J. MOSSINGHOFF

Commissioner of Patents and Trademarks